(12) United States Patent
Pollok et al.

(10) Patent No.: US 7,338,691 B2
(45) Date of Patent: Mar. 4, 2008

(54) COOK-IN PATCH BAG AND PROCESS FOR USING SAME

(75) Inventors: Kevin D. Pollok, Simpsonville, SC (US); H. Walker Stockley, III, Spartanburg, SC (US); Jay B. Wilson, Woodruff, SC (US)

(73) Assignee: Cryovac, Inc., Duncan, SC (US)

( * ) Notice: Subject to any disclaimer, the term of this patent is extended or adjusted under 35 U.S.C. 154(b) by 599 days.

(21) Appl. No.: 09/917,077

(22) Filed: Jul. 27, 2001

(65) Prior Publication Data

US 2003/0021870 A1 Jan. 30, 2003

(51) Int. Cl.
*F16B 4/00* (2006.01)
*B65D 85/00* (2006.01)

(52) U.S. Cl. .................. 428/34.9; 426/129; 383/119
(58) Field of Classification Search ............... 206/484; 383/119, 103, 114–116; 426/106, 124, 127, 426/129, 415; 428/34.1, 34.8, 35.2, 34.9
See application file for complete search history.

(56) References Cited

U.S. PATENT DOCUMENTS

| | | | |
|---|---|---|---|
| 3,383,746 A | | 5/1968 | Narduzi et al. |
| 3,552,090 A | | 1/1971 | Roberts et al. |
| 3,628,576 A | | 12/1971 | Owen |
| 4,064,296 A | | 12/1977 | Bornstein et al. |
| 4,144,219 A | * | 3/1979 | Malloy ................. 524/793 |
| 4,194,618 A | * | 3/1980 | Malloy ................. 206/205 |
| 4,755,403 A | * | 7/1988 | Ferguson ............... 428/34.9 |
| 4,770,731 A | | 9/1988 | Ferguson |
| 4,855,183 A | | 8/1989 | Oberle |
| 4,879,430 A | | 11/1989 | Hoffman |
| 5,206,075 A | | 4/1993 | Hodgson, Jr. |
| 5,213,900 A | | 5/1993 | Friedrich |
| 5,241,031 A | | 8/1993 | Mehta |
| 5,272,236 A | | 12/1993 | Lai et al. |
| 5,278,272 A | | 1/1994 | Lai et al. |
| 5,298,326 A | | 3/1994 | Norpoth et al. |
| 5,302,402 A | | 4/1994 | Dudenhoeffer et al. |
| 5,376,394 A | * | 12/1994 | Dudenhoeffer et al. ..... 426/415 |
| 5,480,945 A | | 1/1996 | Vicik |
| 5,540,646 A | | 7/1996 | Williams et al. |
| 5,545,419 A | | 8/1996 | Brady et al. |
| 5,759,648 A | | 6/1998 | Idlas |
| 5,773,106 A | | 6/1998 | DeGroot et al. |
| 5,837,358 A | | 11/1998 | Bauer et al. |

(Continued)

FOREIGN PATENT DOCUMENTS

EP 0 622 437 A1 11/1994

(Continued)

OTHER PUBLICATIONS

U.S. Appl. No. 09/446,807, DePoorter et al, "Patch Bag Having Seal Through Patches".

(Continued)

*Primary Examiner*—Luan K. Bui
(74) *Attorney, Agent, or Firm*—Rupert B. Hurley, Jr.

(57) ABSTRACT

A cook-in bag having a patch adhered thereto provides is designed for cook-in of bone-in meat products. The patch is adhered to the bag with an adhesive capable of withstanding cook-in conditions.

13 Claims, 7 Drawing Sheets

U.S. PATENT DOCUMENTS

| | | | |
|---|---|---|---|
| 5,843,502 | A | 12/1998 | Ramesh |
| 5,895,587 | A | 4/1999 | Sorensen |
| 6,254,969 | B1 | 7/2001 | Williams et al. |
| 6,387,613 | B1 | 9/2001 | Childress et al. |
| 6,346,285 | B1 | 2/2002 | Ramesh |
| 6,383,537 | B1 | 5/2002 | Brady et al. |

FOREIGN PATENT DOCUMENTS

| | | |
|---|---|---|
| EP | 0 822 207 A1 | 2/1998 |
| EP | 1 095 874 | 5/2001 |
| EP | 1 095 874 A2 | 5/2001 |
| WO | 90/03414 | 4/1990 |
| WO | 93/03093 | 2/1993 |
| WO | 96/00688 | 1/1996 |
| WO | 98/45187 | 10/1998 |

OTHER PUBLICATIONS

U.S. Appl. No. 08/941,602, Mize et al, "Patch Bag and Process of Making Same".

Wild et al, *J. Poly. Sci. Poly. Phys. Ed.*, vol. 20, p. 441 (1982).

U.S. Appl. No. 09/426,827, filed Oct. 25, 1999, Mudar et al, "Patch Bag with Patch Containing High and Low Crystallinity Ethylene Copolymers".

Ashland Chemical Co., "Flexible Packaging & Laminating Adhesives, C-CAT-104, May 1998".

* cited by examiner

COOK-IN PATCH BAG AND PROCESS FOR USING SAME

FIELD OF THE INVENTION

The present invention relates the cook-in packaging of meat products.

BACKGROUND OF THE INVENTION

For several years the food packaging industry has utilized a packaging film from which bags and casings have been made which are of improved structural soundness such that they have been fully characterized as cook-in. A precooked food product has been attractively packaged using a film within which the product was precooked. The film has been used primarily for cook-and-ship end-use, wherein a meat product is packaged in the film and cooked while in the film, and is thereafter cooled and shipped to wholesaler, retailer, or consumer, without being overwrapped and without having the film stripped therefrom and thereafter being re-packaged in another film.

The phrase "cook-in" as used herein refers to the process of cooking a product packaged in a material capable of withstanding exposure to long and slow cooking conditions while containing the food product, for example cooking at 57° C. to 121° C. (i.e., 135° F.–250° F.) for 2–12 hours, preferably 57° C. to 95° C. (i.e., 135° F.–203° F.) for 2–12 hours. Cook-in packaged foods are essentially pre-packaged, pre-cooked foods which may be directly transferred to the consumer in this form. These types of foods may be consumed with or without warming. Cook-in packaging materials maintain seal integrity, i.e., any heat seals should maintain their integrity during cook-in, and are conformable to the contained food product. Preferably, conformability is achieved by the film being heat-shrinkable so as to form a tightly fitting package. Additional optional characteristics of films for use in cook-in applications include delamination-resistance, low $O_2$-permeability, heat-shrinkability, and optical clarity.

Cook-in films preferably have a tendency for adhesion to the food product, thereby preventing "cook-out", i.e., "purge", which is the collection of juices between the outer surface of the food product and the meat-contact surface of the film, i.e., the surface in direct contact with the meat. This meat adhesion characteristic of the meat contact layer serves to both prevent cook-out (and thereby prevent an unattractive package or the need to strip the film from the meat and repackage the meat), to increase product yield, and to prevent the meat from losing juices which improve its edible character. As used herein, the term "adhere", with respect to meat-adhesion, refers to a meat-contact surface of the film which bonds during cook-in to the contained food product to an extent sufficient to substantially prevent accumulation of fluids between the film and the contained meat product.

It has been found that bone-in meat products, such as ribs, are especially abusive to the cook-in bags in which they are packaged, in spite of the fact that the cook-in film contains polymers such as polyamide, polypropylene, and/or polyester, each of which is more abuse-resistant than, for example, polyolefins. During cooking, shipping, and handling of the packaged meat products, the sharp bone ends tend to cut through the bag, which is undesirable. It would be desirable to provide the cook-in bag with additional resistance to puncture from sharp bone ends.

SUMMARY OF THE INVENTION

In the present invention provides a cook-in bag having one or more patches thereon to reduce the number of bag punctures by bone ends. The patch is adhered to the bag with an adhesive. It has been found that the acrylic emulsion adhesive used to adhere patches in the prior art does not survive typical cook-in conditions, i.e., the patch delaminates from the bag due to the cook-in conditions. However, in the patch bag of the present invention, the patch is adhered to the bag with an adhesive capable of withstanding cook-in conditions, so that the patch does not delaminate from the bag during cook-in.

As a first aspect, the present invention is directed to a patch bag comprising a bag and a patch adhered thereto, the bag having a heat seal capable of withstanding a temperature of at least 70° C. for a period of at least 4 hours, the patch being adhered to the bag with an adhesive capable of maintaining adhesion of the patch to the bag at a temperature of at least 97° C. for a period of at least 10 minutes, preferably at least 20 minutes, more preferably at least 45 minutes.

Preferably, the film from which the bag is formed has a heat seal layer comprising polyamide and/or polyester. Preferably, the bag film also has at least a seal layer, an oxygen barrier layer, and an abuse layer. Preferably, the bag film has a total thickness of from 1–20 mils, more preferably from 2 to 5 mils.

Preferably, the patch film comprises an ethylene-based polymer, more preferably, at least one member selected from the group consisting of linear low density polyethylene, very low density polyethylene, homogeneous ethylene/alpha-olefin copolymer, ethylene/vinyl acetate copolymer, and ionomer. Preferably, the patch film is free of polyamide and polyester. Preferably, the patch film has a total thickness of from 1–20 mils, more preferably from 2 to 8 mils.

Preferably, the bag is a lay-flat bag having a first patch adhered to a first lay-flat side of the bag, and a second patch adhered to a second lay-flat side of the bag. The bag can be an end-seal bag, a side-seal bag, an L-seal bag, or a U-seal bag (i.e., a pouch). Preferably, the patches leave uncovered a portion of the bag between the patch and the open top of the bag, so that the bag can more easily be sealed after the product is placed within the bag. Preferably, the patches are adhered to the outside of the bag. Preferably, the adhesive comprises polyurethane.

Preferably, the bag is made from a film having a total free shrink of at least 10 percent at 185° F., more preferably from 10–120 percent, more preferably 15–80 percent. Preferably, the patch is made from a heat-shrinkable film having a total free shrink of at least 10 percent at 185° F., more preferably from 10–120 percent, more preferably 15–80 percent.

Optionally, the seal can be through the bag and not through the patch. Such seals are easier to make. However, in a preferred embodiment the seal is through both the patch and the bag. Although such seals are more difficult to make, they provide patch coverage up to the seal itself. A method for making such a "through the patch" heat seal is disclosed in U.S. Ser. No. 09/446,807, to DePoorter et al, entitled "Patch Bag Having Seal through Patches", which is hereby incorporated, in its entirety, by reference thereto. Optionally, the patch or patches can overhang the edges of the bag. In one preferred embodiment of the invention, a lay-flat bag has a patch on each lay-flat side thereof, with the patches each overhanging the same edge or edges of the bag, with the overhanging portions of the patches being adhered to one another with the adhesive used to adhere the patches to the bag. Such patch bags are described in U.S. Ser. No. 09/193, 918, to Brady et al, entitled "Patch Bag Having Overhanging Bonded Patches", which is hereby incorporated, in its entirety, by reference thereto. A particularly preferred patch bag in accordance with the present invention has both overhanging bonded patches with the heat seal being through both the bag and the patches.

As a second aspect, the present invention is directed to a patch bag comprising a bag and a patch adhered thereto, the bag having a heat seal capable of withstanding a temperature of at least 70° C. for a period of at least 4 hours, with the patch being adhered to the bag with an adhesive capable of maintaining adhesion of the patch to the bag at a temperature of at least 60° C. for a period of at least 4 hours, preferably at least 7 hours, more preferably at least 10 hours. Preferred patch bags in accordance with this second aspect are otherwise in accordance with preferred patch bags described above with reference to the first aspect of the invention.

As a third aspect, the present invention is directed to a process for preparing a cooked bone-in meat product, comprising: (A) placing an uncooked, bone-in meat product into a patch bag having a patch adhered to a bag with a urethane-based adhesive, (B) evacuating the atmosphere from within the bag; (C) sealing the bag shut so that the product is enveloped by the patch bag, (D) shrinking the bag, and (E) cooking the product while the product is within the patch bag, the cooking being carried out at a temperature of at least 70° C. for a period of at least 4 hours.

DETAILED DESCRIPTION OF THE INVENTION

Figure 1:
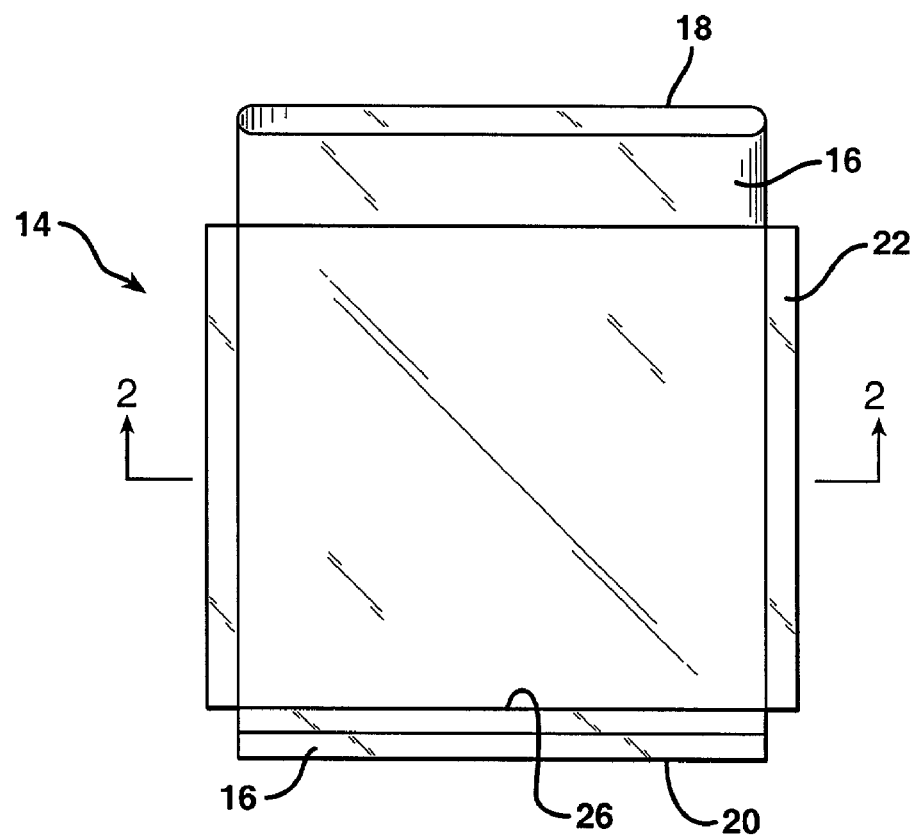
FIG. 1 illustrates a schematic of a preferred end-seal cook-in patch bag according to the present invention, in lay-flat view.

The term "cook-in" as used herein is intended to refer to packaging material structurally capable of withstanding exposure to cook-in time-temperature conditions while containing a food product. Cook-in packaged foods are essentially pre-packaged, pre-cooked foods that go directly to the consumer in that configuration which may be consumed with or without warming. Cook-in time-temperature conditions typically refer to a long slow cook, for example submersion in water at 70°–80° C. for 4–6 hours. Such cook-in time-temperature requirements are representative of institutional cooking requirements. Submersion at 80° C. for 12 hours probably represents the limiting case. Under such conditions, a packaging material properly characterized as cook-in will maintain seal integrity and will be delamination resistant. Additionally, the packaging film should be heat shrinkable under these conditions so as to form a tightly fitting package and preferably should have some tendency for product adhesion to prevent "cook-out" or collection of juices between the surface of the food product and the interior surface of the packaging material.

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

As used herein, the term "barrier", and the phrase "barrier layer", as applied to films and/or film layers, is used with reference to the ability of a film or film layer to serve as a barrier to one or more gases. Oxygen (i.e., $O_2$) barrier layers can comprise, for example, ethylene/vinyl alcohol copolymer, polyvinyl chloride, polyvinylidene chloride, polyamide, polyester, polyacrylonitrile, etc., as known to those of skill in the art; preferably, the oxygen barrier layer comprises ethylene/vinyl alcohol copolymer, polyvinyl chloride, polyvinylidene chloride, and polyamide; more preferably, vinylidene chloride/methyl acrylate copolymer, as known to those of skill in the art.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal; preferably, abuse layers comprise polymer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer, etc. as known to those of skill in the art; more preferably, ethylene/vinyl acetate copolymer and ethylene/alpha-olefin copolymer having a density of from about 0.91 to 0.93; still more preferably, the abuse layer of the bag film comprises 85–100 weight percent ethylene/vinyl acetate copolymer, and 0–15 weight percent LLDPE, while the still more preferred abuse layer of the patch film comprises 85–100 weight percent LLDPE and 0–15 weight percent ethylene/vinyl acetate copolymer having a vinyl acetate content of about 9 percent.

As used herein, the phrase "tie layer" refers to any internal layer having the primary purpose of adhering two layers to one another. Tie layers can comprise any polymer having a polar group grafted thereon, so that the polymer is capable of covalent bonding to polar polymers such as polyamide and ethylene/vinyl alcohol copolymer; preferably, tie layers comprise at least one member selected from the group consisting of polyolefin, modified polyolefin, ethylene/vinyl acetate copolymer, modified ethylene/vinyl acetate copolymer, and homogeneous ethylene/alpha-olefin copolymer; more preferably, tie layers comprise at least one member selected from the group consisting of anhydride modified grafted linear low density polyethylene, anhydride-grafted low density polyethylene, homogeneous ethylene/alpha-olefin copolymer, and anhydride-grafted ethylene/vinyl acetate copolymer.

As used herein, the phrases "food-contact layer" and "meat-contact layer", refer to a layer of a multilayer film which is in direct contact with the food/meat in the package comprising the film. The food-contact/meat-contact layer is an outer layer of the multilayer film, in the sense that the food-contact/meat-contact layer is in direct contact with the meat product within the package. The food-contact/meat-contact layer is an inside layer in the sense that with respect to the packaged food product/meat product, the food-contact/meat-contact layer is the inside layer (i.e., innermost layer) of the package, this inside layer being in direct contact with the food/meat.

As used herein, "EVOH" refers to ethylene/vinyl alcohol copolymer. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the term "lamination", the term "laminate", and the phrase "laminated film", refer to the process, and resulting product, made by bonding together two or more layers of film or other materials. Lamination can be accomplished by joining layers with adhesives, joining with heat and pressure, spread coating, and extrusion-coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention preferably has a molecular weight distribution ($M_w/M_n$) of less than 2.7; more preferably, from about 1.9 to 2.5; still more preferably, from about 1.9 to 2.3. The composition distribution breadth index (CDBI) of such homogeneous ethylene/alpha-olefin copolymers is preferably greater than about 70 percent. The CDBI refers to the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p. 441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 110° C. Preferably, the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "anhydride-containing polymer" and "anhydride-modified polymer", refer to one or more of the following: (1) polymers obtained by copolymerizing an anhydride-containing monomer with a second, different monomer, and (2) anhydride-grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene-catalyzed polymers such as EXACT™ resins obtainable from the Exxon Chemical Company, and TAFMER™ resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY® resins, are also included as another type of homogeneous ethylene alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the term "adhered" is inclusive of films which are directly adhered to one another using a heat seal or other means, as well as films which are adhered to one another using an adhesive which is between the two films.

As used herein, the phrase "directly adhered", as applied to film layers, refers to the adhesion of the subject film layer to the object film layer, without a tie layer, adhesive, or other layer therebetween. In contrast, as used herein, the word "between", as applied to a film layer expressed as being between two other specified layers, includes both direct adherence of the subject layer to one or more of the two other layers it is between, as well as including a lack of direct adherence to either or both of the two other layers the subject layer is between, i.e., one or more additional layers can be imposed between the subject layer and one or more of the layers the subject layer is between.

As used herein, the phrase "machine direction", herein abbreviated "MD", refers to a direction "along the length" of the film, i.e., in the direction in which the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art.

Although the films used in the cook-in patch bag according to the present invention can be monolayer films or multilayer films, the patch bag comprises at least two films laminated together. Preferably, the patch bag is comprised of a patch film and a bag film which together comprise a total of from 2 to 20 layers; more preferably, from 2 to 12 layers; and still more preferably, from 4 to 9 layers.

In general, the multilayer film(s) used in the present invention can have any total thickness desired, so long as the film provides the desired properties for the particular packaging operation in which the film is used, e.g. abuse-resistance (especially puncture-resistance), modulus, seal strength, optics, etc.

The polymer components used to fabricate multilayer films for use in the cook-in patch bag of the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

The multilayer films used to make the patch bag of the present invention are preferably irradiated to induce crosslinking, as well as corona treated to roughen the surface of the films which are to be adhered to one another. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film. To produce crosslinking, a suitable radiation dosage of high energy electrons is in the range of up to about 12 MR, more preferably about 2 to about 9 MR, and still more preferably, about 3 MR. Preferably, irradiation is carried out by an electron accelerator and the dosage level is determined by standard dosimetry methods.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material. Although corona treatment is a preferred treatment of the multilayer films used to make the patch bag of the present invention, plasma treatment of the film may also be used.

Figure 2:
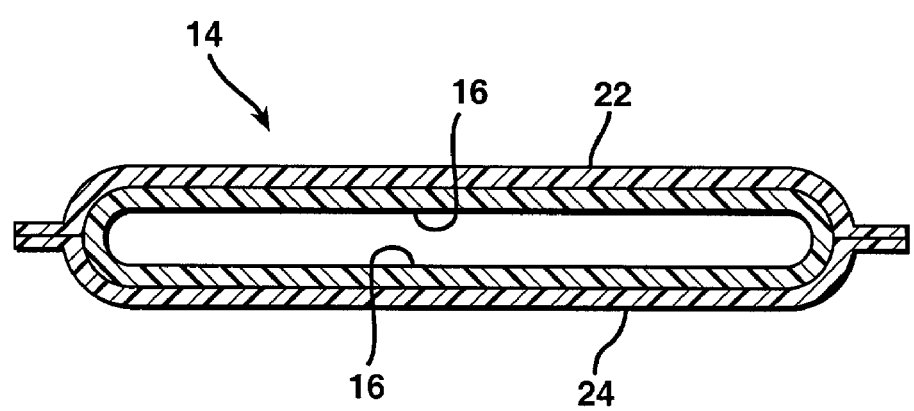
FIG. 2 illustrates a cross-sectional view of the preferred end-seal cook-in patch bag according to FIG. 1, taken through section 2—2 of FIG. 1.

FIGS. 1 and 2 illustrate a preferred cook-in patch bag 14 according to the present invention. Cook-in patch bag 14 has cook-in end-seal bag 16 (made from a seamless tubing extruded from an annular die) having top 18, bottom 20, patches 22 and 24, and transverse bottom seal 26. Seal 26 is a "seal through patch" seal, and is made by applying heat through both patches 22 and 24, as disclosed in U.S. Ser. No. 09/446,807, identified above. Patches 22 and 24 are adhered to the outside surface of cook-in bag 16 with an adhesive, with portions of patches 22 and 24 overhanging the side edges of end-seal bag 16, with the overhanging portions of patches 22 and 24 being adhered to one another.

The adhesive used to adhere the patch (or patches) to the cook-in bag must be capable of maintaining adhesion of the patch to the bag at a temperature of at least 97° C. for a period of at least 10 minutes, more preferably for at least 20 minutes, and still more preferably for at least 45 minutes. Since cook-in processes are not all the same, alternatively the adhesive must be capable of maintaining adhesion of the patch to the bag at a temperature of at least 60° C. for a period of at least 4 hours, more preferably for at least 7 hours, and still more preferably for at least 10 hours. A preferred adhesive which can meet all of the above criteria is a urethane-based adhesive. This preferred adhesive is formulated by mixing 99 weight percent of a urethane resin sold by Ashland Specialty Chemical Company of Columbus, Ohio (a division of Ashland Inc.), under the trade name PURETHANE A-1078 CVAC resin with 1 weight percent of catalyst also sold by Ashland under the trade name C-CAT 104 catalyst.

Figure 3:
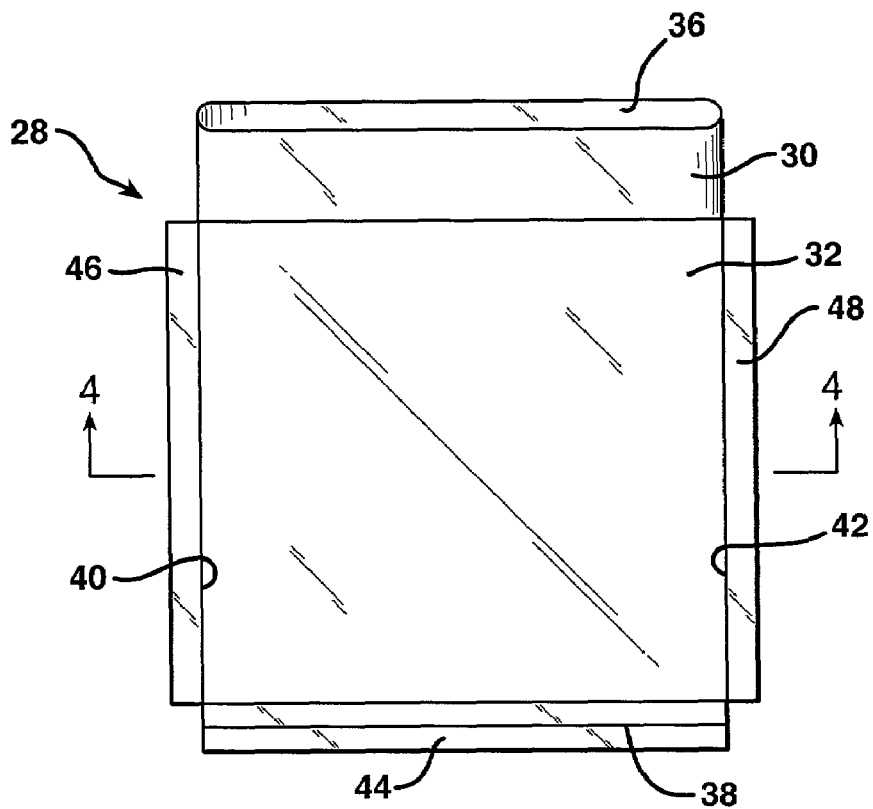
FIG. 3 illustrates a schematic of a first alternative end-seal cook-in patch bag according to the present invention.
Figure 4:
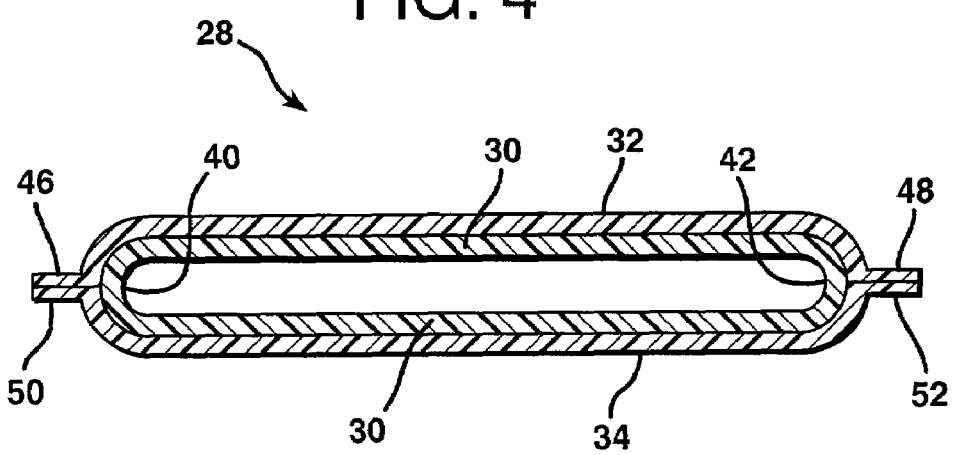
FIG. 4 illustrates a cross-sectional view of the preferred end-seal cook-in patch bag according to FIG. 3, taken through section 4—4 of FIG. 3.

FIGS. 3 and 4 illustrate alternative cook-in patch bag 28, made up of seamless tubular end-seal cook-in bag 30 and patches 32 and 34 adhered to the outside surface of cook-in bag 30. Cook-in bag 30 has open top 36, end-seal 38, first side edge 40, second side-edge 42, and bottom skirt 44. First patch 32 has first overhang 46, which overhangs first side edge 40, and second overhang 48, which overhangs second side edge 42. Second patch 34 has third overhang 50, which overhangs first side edge 40 and is adhered to first overhang 46, and fourth overhang 52 which overhangs second side edge 42 and is adhered to second overhang 48. Thus, over the length of cook-in bag 30 on which first patch 32 and second patch 34 are adhered, the full width of cook-in bag 30 is "covered" by the combination of patches 32 and 34, i.e., together, patches 32 and 34 constitute a "full width" coverage of cook-in bag 30. Unlike the cook-in patch bag of FIGS. 1 and 2, the end seal of the cook-in patch bag of FIGS. 3 and 4 does not have an end (i.e., bottom) seal through the patches. Rather, the seal is only through bag 30 because it is more difficult to seal through the patches.

Figure 5:
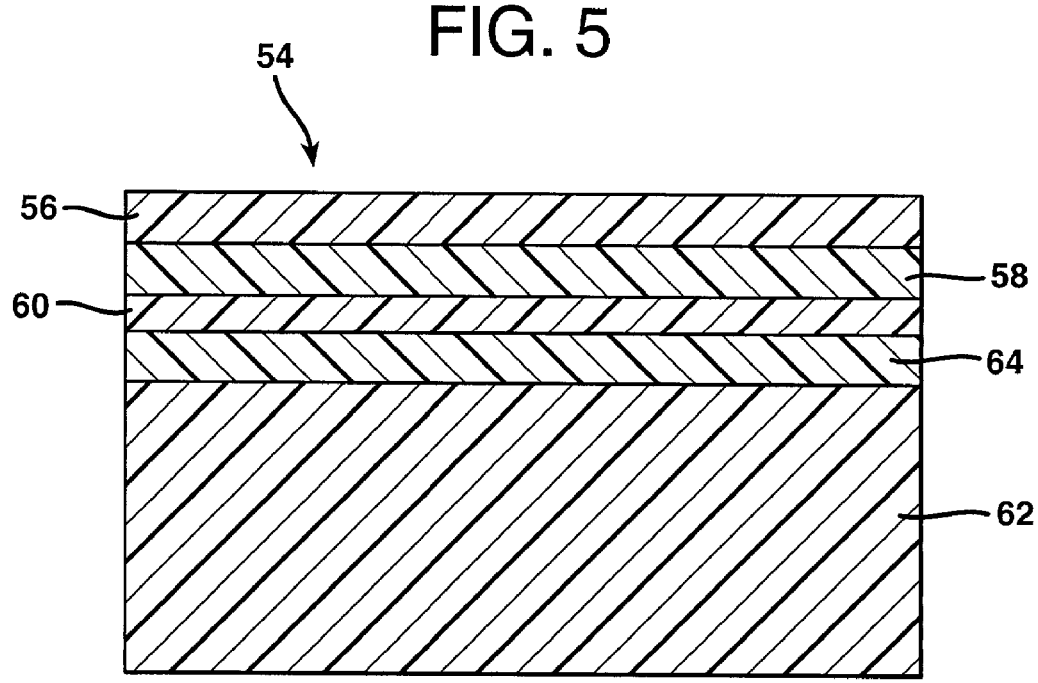
FIG. 5 illustrates a cross-sectional view of a preferred multilayer film for use as a bag film in the cook-in patch bag of the present invention.

FIG. 5 illustrates an enlarged cross-sectional view of a preferred film for use as the cook-in bag in the cook-in patch bag of the present invention. The film of FIG. 5, and other preferred cook-in films, are disclosed in copending U.S. Ser. No. 09/961,187, filed Oct. 30, 1997, in the name of Ramesh, which is hereby incorporated, in its entirety, by reference thereto.

In FIG. 5, multilayer film 54 comprises outer film layer 56, which is to serve as a seal layer and an inside layer of the cook-in bag, and which also serves as a food-contact layer. Preferably, outer layer 56 comprises a polyamide having a melting point of from about 260° F. to 400° F. Cook-in film 54 further comprises inner layer 58 which also preferably comprises a polyamide as well as a polymer which retards the crystallization of the polyamide. The crystallization retarding polymer can be a polyolefin or a different polyamide. Cook-in film 54 further comprises inner layer 60, which preferably serves as an $O_2$-barrier layer. Preferred $O_2$-barrier polymers include ethylene/vinyl alcohol copolymer, polyamide, polyvinylidene chloride, and polyalkylene carbonate. Cook-in film 54 further comprises outer film layer 62, which provides cook-in film 54 with desired abuse, shrink, and optical characteristics, and preferably comprises a polyolefin such as ethylene/vinyl acetate copolymer, linear low density polyethylene and/or high density polyethylene. Finally, preferred cook-in film 54 further comprises inner layer 64, which serves as a tie layer between outer layer 62 and inner $O_2$-barrier layer 60. Inner layer 64 preferably comprises an anhydride-modified polyolefin. Preferred layer thicknesses for the film of FIG. 5 are: 0.2–0.3 mils for layer 56, about 0.15 mil for each of layers 58, 60, and 64, and about 1 mil for layer 62.

Another preferred film for the cook-in bag is a six layer film having a total thickness of 2.35 mils. The film has an A/B/C/D/C/E structure. The A layer serves as a seal layer has a thickness of about 0.5 mil and is composed of PKF 409 propylene/ethylene copolymer having an ethylene content of 3.2%, this resin being obtained from Solvay Chemicals. The B layer has a thickness of about 0.5 mil and is composed of EXACT 3128 homogeneous ethylene/butene resin having a density of 0.900 g/cc and a melt index of 1.2. The C layers serve as tie layers and each have a thickness of 0.15 mil and are each composed of TYMOR 1203 anhydride modified ethylene/alpha-olefin copolymer having a density of 0.908, obtained from Rohm and Haas. The D layer is an O2-barrier layer having a thickness of about 0.17 mil and is composed of EVAL E-105A ethylene/vinyl alcohol copolymer containing 44 mole percent ethylene, obtained from Evalca. The E layer serves as an abuse layer and has a thickness of about 0.83 mil and is composed of a blend of (a) 90 weight percent PE-1651C528 ethylene/vinyl acetate copolymer containing 6.5 percent vinyl acetate and having a melt index of 0.5, obtained from Huntsman Polymer, with (b) 10 weight percent FORTIFLEX T60-500-119 high density polyethylene having a density of 0.961 g/cc and a melt index of 6.2, produced by Solvay.

Alternative preferred cook-in films for use in forming the cook-in bag portion of the cook-in patch bag of the present invention include the cook-in films disclosed in U.S. Pat. No. 4,855,183, to T. T. Oberle, entitled "Multiple-Layer Cook-In Film", which is hereby incorporated, in its entirety, by reference thereto, as well as the cook-in films disclosed in U.S. Pat. No. 5,213,900, to S. G. Friedrich, entitled "Cook-in Film with Improved Seal Strength", also hereby incorporated, in its entirety, by reference thereto.

Figure 6:
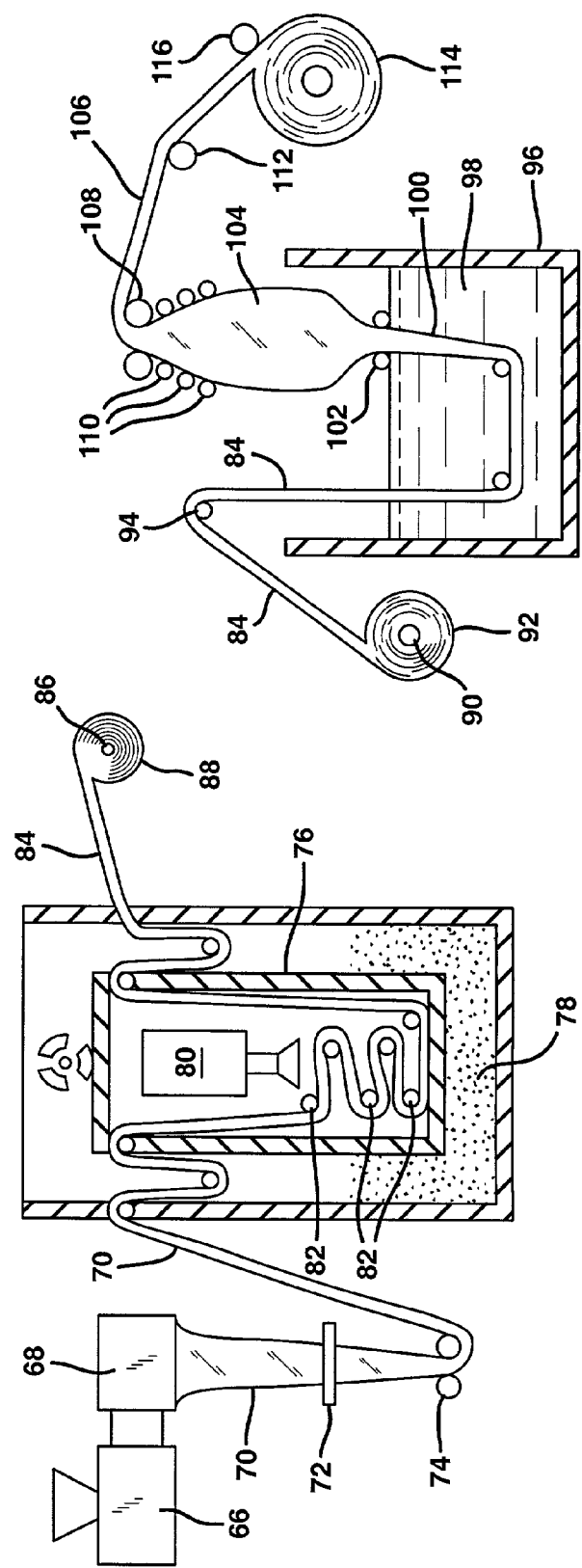
FIG. 6 illustrates a schematic view of a preferred process for producing the multilayer film of FIG. 5.

FIG. 6 illustrates a preferred method for making the cook-in film described above. In the process illustrated in FIG. 6, solid polymer beads (not illustrated) are fed to a plurality of extruders (for simplicity, only extruder 66 is illustrated). Inside extruders 66, the polymer beads are degassed, following which the resulting bubble-free melt is forwarded into die head 68, and extruded through an annular die, resulting in downwardly cast, annular, seamless tubing tape 70 which is preferably from about 15 to 30 mils thick, and preferably has a lay-flat width of from about 2 to 10 inches.

After cooling or quenching by water spray from cooling ring 72, tubing tape 70 is collapsed by pinch rolls 74, and is thereafter fed through irradiation vault 76 surrounded by shielding 78, after which tubing tape 70 is irradiated with high energy electrons (i.e., ionizing radiation) from iron core transformer accelerator 80. Tubing tape 70 is guided through irradiation vault 76 on rollers 82. Preferably, tubing tape 70 is irradiated to a level of from about 40–100 kGy, resulting in irradiated tubing tape 84. Irradiated tubing tape 84 is wound upon windup roll 86 upon emergence from irradiation vault 76, forming irradiated tubing tape coil 88.

After irradiation and windup, windup roll 86 and irradiated tubing tape coil 88 are removed and installed as unwind roll 90 and unwind irradiated tubing tape coil 92, on a second stage in the process of making the film as ultimately desired. Irradiated tubing 84, being unwound from unwind tubing tape coil 92, is then passed over guide roll 94, after which irradiated tubing 84 is passed through hot water bath tank 96 containing hot water 98. Irradiated tubing 84 is immersed in hot water 98 (preferably having a temperature of about 185–210° F.) for a period of about 20 to 60 seconds, i.e., for a time period long enough to bring the tubing up to the desired temperature for biaxial orientation. Thereafter, hot, irradiated tubular tape 100 is directed through nip rolls 102, and is forced around trapped bubble 104, thereby transversely stretching hot, irradiated tubular tape 100 so that an oriented film tube 106 is formed. Furthermore, while being blown, i.e., transversely stretched, nip rolls 108 have a surface speed higher than the surface speed of nip rolls 102, thereby resulting in longitudinal orientation. As a result of the transverse stretching and longitudinal drawing, oriented film tube 106 is produced, this blown tubing preferably having been both stretched in a ratio of from about 1:1.5 to 1:6, and drawn in a ratio of from about 1:1.5 to 1:6. More preferably, the stretching and drawing are each performed at a ratio of from about 1:2 to 1:4. The result is a biaxial orientation of from about 1:2.25 to 1:36, more preferably, 1:4 to 1:16. While bubble 104 is maintained between pinch rolls 102 and 108, oriented film tube 106 is collapsed by rollers 110, and thereafter conveyed through pinch rolls 108 and across guide roll 112, and then rolled onto wind-up roll 114. Idler roll 116 assures a good wind-up. The resulting heat-shrinkable multilayer film 106 can be used in the making of the cook-in bag portion of the cook-in patch bag of the present invention.

Figure 7:
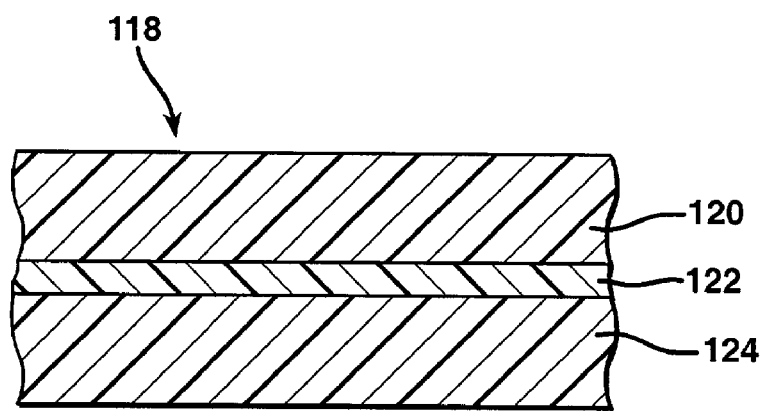
FIG. 7 illustrates a cross-sectional view of preferred multilayer film for use as a patch film in the cook-in patch bag of the present invention.

In FIG. 7, multilayer film 118 is a preferred film for use as the patch component in the cook-in patch bag of the present invention. Multilayer film 118 has outer layers 120 and 124, and inner layer 122. Outer layers 120 and 124 provide the patch film with puncture-resistance and abuse characteristics, while inner layer 122 serves as a self-welding layer.

The patch film is preferably produced by a process similar to the process for making the cook-in bag film, i.e., as described above for FIG. 6. Preferably, patch film has a thickness of from 2 to 6 mils, more preferably 3 to 5 mils. In one preferred process for making the patch film, the extruded, oriented film tubing is self-welded to form a patch film having a thickness twice the thickness of the oriented film of the film tubing. However, under some cook-in conditions, it has been found that such a self-welded film (i.e., produced using the process disclosed in U.S. Pat. No. 4,770,703, to Daniel J. Ferguson, entitled "Method of Making a Patch for a Shrinkable Bag" which is hereby incorporated, in its entirety, by reference thereto) may delaminate, necessitating a different process for making the patch film. The delamination problem can be avoided by laminating two or more relatively thin oriented patch films to one another, e.g., two films each having a thickness of about 2 mil, using an adhesive capable of withstanding the particular cook-in conditions to which the film will be subjected. Another process could be to use a fully coextruded patch film, e.g., a 1–3 mil patch film, more preferably a 2–3 mil patch film. Such a fully coextruded film could use linear low density polyethylene, very low density polyethylene, homogeneous ethylene/alpha-olefin copolymer, polyamide, and/or polyester as the puncture-resistant component.

Figure 8:
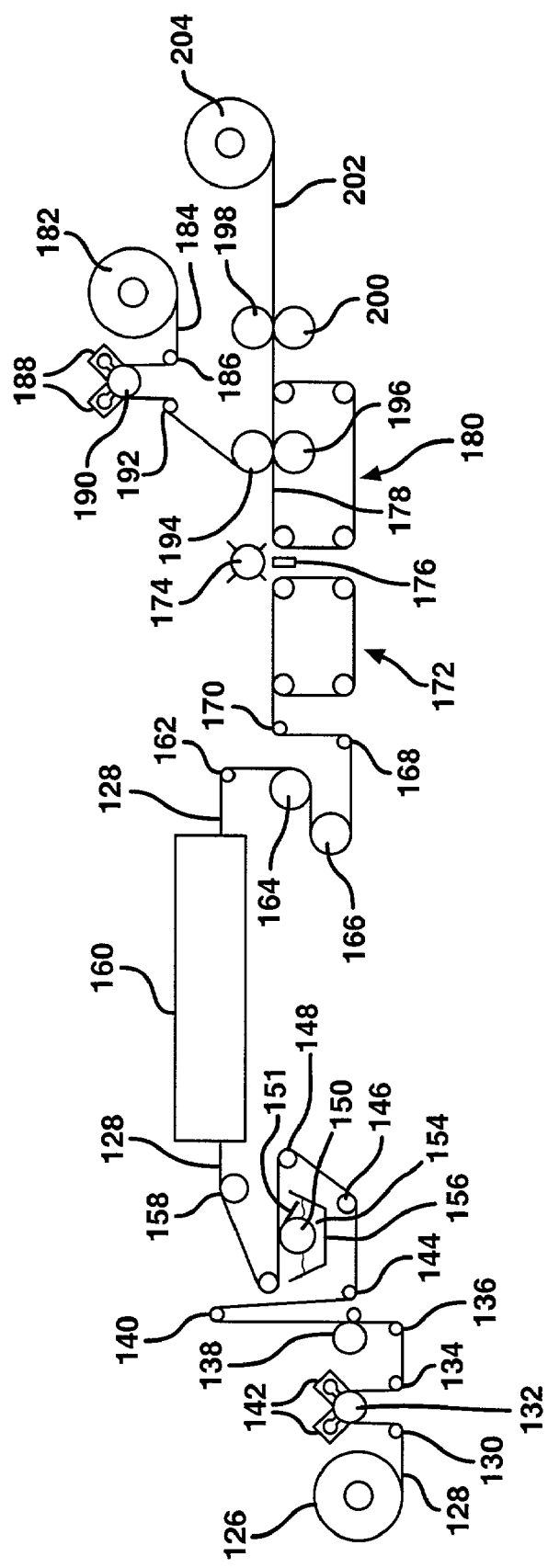
FIG. 8 illustrates a schematic representation of a preferred process for manufacturing a cook-in patch bag according to the present invention.

In the bag-making process, if an end-seal patch bag is the desired product, the tubing having the first and second patches adhered thereto is sealed and cut so that an end-seal bag is produced. FIG. 8 illustrates a schematic representation of a preferred process for manufacturing a patch bag according to the present invention (e.g., a patch bag as illustrated in FIGS. 1, 2, 3, and 4) from films such as the films described above including the films illustrated in FIGS. 5 and 7, which in turn can be prepared according to the process of FIG. 6.

In FIG. 8, patch film roll 126 supplies patch film 128. Patch film 128 is directed, by idler roll 130, to corona treatment devices 142 which subject the upper surface of patch film 128 to corona treatment as patch film 128 passes over corona treatment roll 132. After corona treatment, patch film 128 is forwarded over idler rolls 134 and 136, and (optional) printing roll 138. Patch film 128 is thereafter directed over idler rolls 140, 144, 146, and 148, and then over rotating anilox roller 150 having adhesive on the surface thereof. Adhesive 154 is provided to roller 150 by adhesive supply 154 in trough 156 within which partially submerged anilox roller 150 rotates (counterclockwise in FIG. 8). The amount of adhesive on the surface of anilox roller 150 is controlled by doctor blade 151. If the urethane-based adhesive described above is being used, it is preferably applied to patch film 128 in an amount of 1.7 pounds per 3000 square feet of film surface. Patch film 128 is then forwarded over idler rollers 152, and then over drying oven entrance idler roll 158, after which adhesive-coated patch film 128 is directed through oven 160 within which patch film 128 is dried to a degree that the adhesive 154 on patch film 128 becomes tacky. Upon exiting oven 160, patch film 128 is directed partially around oven-exit idler roll 162, following which patch film 128 is cooled on chill rolls 164 and 166, each of which has a surface temperature of about 40–45° F., and a diameter of about 12 inches. The cooling of patch film 128 is carried out in order to stabilize patch film 128 from further shrinkage.

Thereafter, patch film 128 is directed, by idler rolls 168 and 170, onto a belt of precutting vacuum conveyor assembly 172, and thereafter forwarded to a rotary scissors-type knife having upper rotary blade assembly 174 and lower blade 176, the knife cutting across the width of patch film 128 in order to form patches 178. Patches 178 are forwarded and held on top of a belt of post-cutting vacuum conveyor assembly 180. While patches 178 are held on the belt of post-cutting vacuum conveyor assembly 180, tubing-supply roll 182 supplies biaxially oriented, lay-flat seamless film tubing film 184, which is directed, by idler roll 186, to corona treatment devices 188 which subject the upper surface of lay-flat tubing film 184 to corona treatment as lay-flat tubing film 184 passes over corona treatment roll 190. After corona treatment, lay-flat tubing film 184 is directed, by idler roll 192, partially around the surface of upper pre-lamination nip roll 194, and through the nip between upper prelaminating nip roll 194 and lower prelaminating nip roll 196, the pre-laminating nip rolls being above and below the post-cutting vacuum conveyor belt. Prelaminating nip rolls 194 and 196 position patches 178 onto the now lower, corona-treated outside surface of lay-flat film tubing 184. After passing through the nip between prelaminating nip rolls 194 and 196, lay-flat tubing 184, now having patches 178 laminated intermittently thereon, exits off the downstream end of the post-cutting vacuum conveyor assembly 180, and is directed through the nip between upper laminating nip roll 198 and lower laminating nip roll 200, these rolls exerting pressure (about 75 psi) in order to secure patches 178 to lay-flat tubing 184, to result in patch-laminated lay-flat tubing 202. Thereafter, patch-laminated lay-flat tubing 202 is wound up to form rewind roll 204, with rewind roll 204 having the laminated patches thereon oriented towards the outer-facing surface of rewind roll 204.

In a subsequent process not separately illustrated, rewind roll 204 is removed from its winder and is positioned in the place of tubing supply roll 182, and the process of FIG. 8, described immediately above, is repeated, wherein a second set of patches is laminated to patch-laminated lay-flat tubing 204, this second set of patches being applied to the other side of patch-laminated lay-flat tubing 204. Of course, the second set of patches are accurately aligned and registered so that they are substantially aligned with the positioning of the first set of patches laminated to lay-flat tubing film 184. In order to achieve accurate alignment, photosensors (i.e., photoeyes, etc.), not illustrated, are used to detect the location of the patch. An appropriate location for such a photosensor is upstream of upper pre-lamination roll 194, below the patch-laminated lay-flat tubing. Once both sets of patches have been applied to lay-flat tubing film 184, the resulting two-patch tubing is directed into a bag-making machine, and by cutting and sealing. In general, sealing and cutting of tubing to produce bags is disclosed in U.S. Pat. No. 3,552,090, U.S. Pat. No. 3,383,746, and U.S. Ser. No. 844,883, filed Jul. 25, 1969, to OWEN, each of these two U.S. Patents as well as the U.S. patent application, hereby being incorporated by reference thereto, in their entireties.

Figure 9:
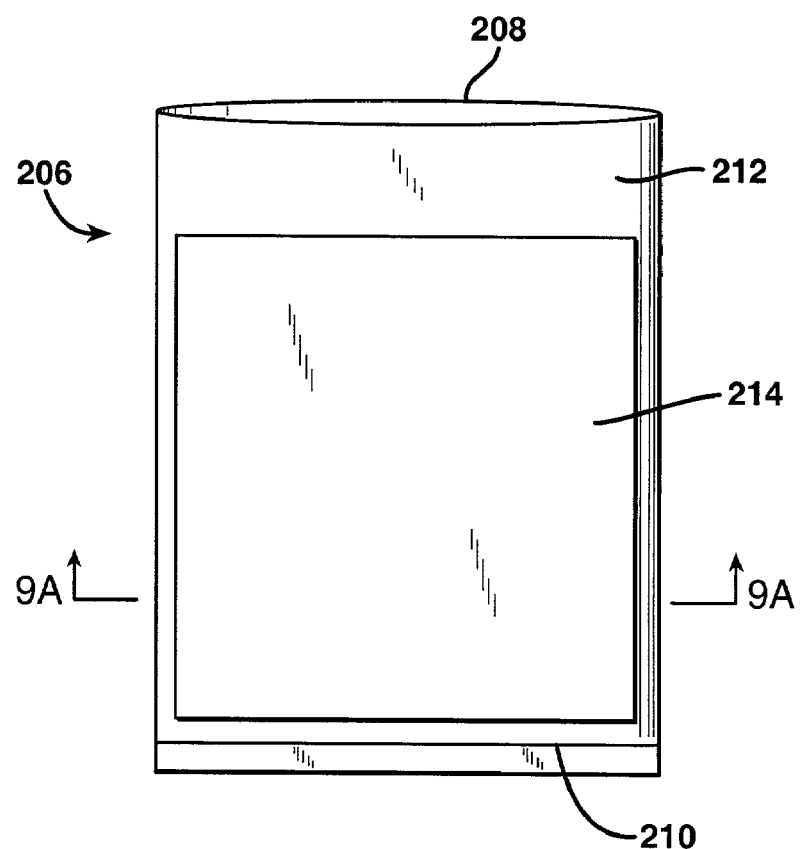
FIG. 9 illustrates a schematic of an alternative end-seal cook-in patch bag according to the present invention, in lay-flat view.
Figure 9A:
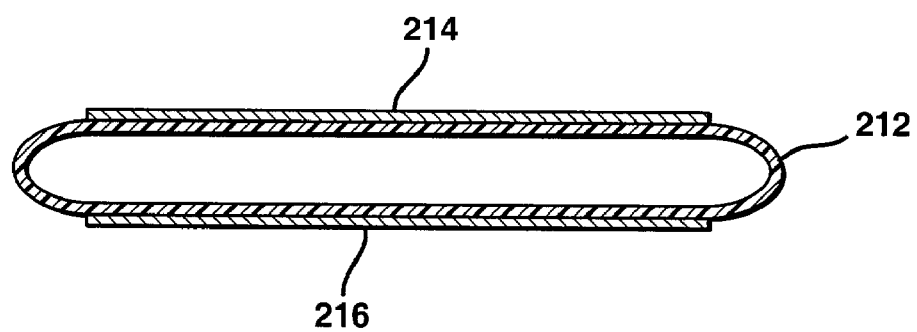
FIG. 9A is a cross-sectional view taken through section 9A—9A of FIG. 9.

FIGS. 9 and 9A illustrate an alternative end-seal cook-in patch bag 206 in accordance with the present invention. Cook-in patch bag 206 is a seamless tubular film having is made up of bag 212 to which patches 214 and 216 are adhered. Cook-in bag 206 has end seal 210 and open top 208. Each patch is confined to one lay-flat side of bag 212, with end seal 210 being through bag 212 but not through either of patches 214 or 216. In addition, patches 214 and 216 doe not extend all the way to either side edges of end-seal bag 212.

Figure 10:
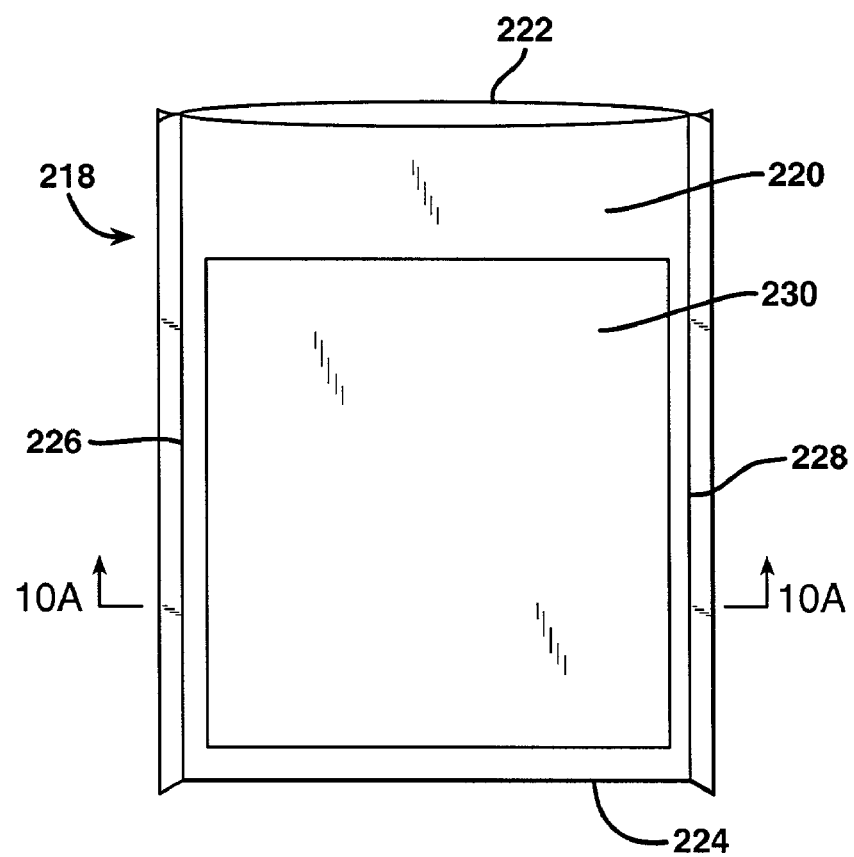
FIG. 10 illustrates a schematic of an alternative end-seal cook-in patch bag according to the present invention, in lay-flat view.
Figure 10A:
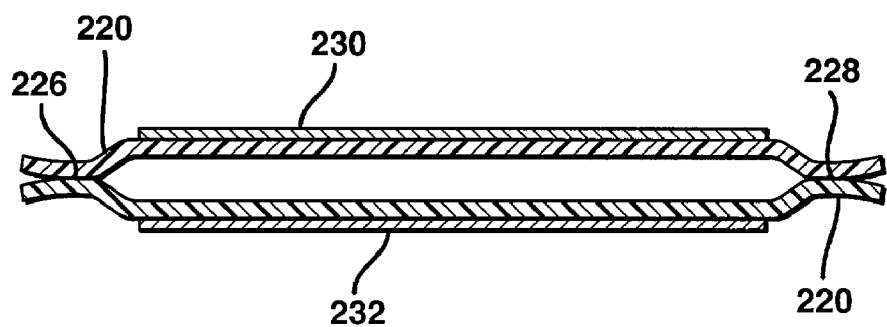
FIG. 10A is a cross-sectional view taken through section 10A—10A of FIG. 10.

FIGS. 10 and 10A together illustrate a side-seal cook-in patch bag 218 in accordance with the present invention. Side-seal cook-in patch bag 218 is made up of bag 220, first patch 230, and second patch 232. Bag 220 has seamless (i.e., folded) bottom edge 224, open top 222, first side seal 226, and second side seal 228. Each of patches 230 and 232 are confined to a lay-flat side of bag 220, with the patches not extending to either of side seals 226 or 228, or to open top 222 or folded bottom 224.

Additional patch and bag arrangements useful as a cook-in patch bag of the present invention include the patch and bag arrangements disclosed in U.S. Pat. No. 6,254,909, to Williams et al, entitled "Shrinkable Bag Having Side Edge Covered with Protective Patch", which is hereby incorporated, in its entirety, by reference thereto. Still further patch and bag arrangements are disclosed in U.S. Ser. No. 08/941, 602, to Mize et al, entitled "Patch Bag and Process of Making Same", filed Sep. 30, 1997, which is hereby incorporated, in its entirety, by reference thereto. Of course, it is necessary to modify these structures by employing a bag having heat seals capable of withstanding cook-in conditions (which is primarily due to the polymeric composition of the heat seal layer), and by providing an adhesive capable of maintaining the adhesion of the patch to the bag during cook-in.

All ranges within all of the above-disclosed ranges are expressly included within this specification. Moreover, layers which are adjacent or directly adhered to one another are preferably of differing chemical composition, especially differing polymeric composition. All reference to ASTM tests are to the most recent, currently approved and published version of the ASTM test identified, as of the priority filing date of this application.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A patch bag comprising a bag having a patch adhered thereto, the bag having a heat seal capable of withstanding a temperature of at least 70° C. for a period of at least 4 hours, the patch being adhered to the bag with an adhesive capable of maintaining adhesion of the patch to the bag at a temperature of at least 60° C. for a period of at least 4 hours, wherein the patch does not cover a portion of the bag between the patch and the open top of the bag.

2. The patch bag according to claim 1, wherein the adhesive is capable of maintaining adhesion of the patch to the bag at a temperature of 60° C. for a period of at least 7 hours.

3. The patch bag according to claim 1, wherein the adhesive is capable of maintaining adhesion of the patch to the bag at a temperature of 60° C. for a period of at least 10 hours.

4. The patch bag according to claim 1, wherein the adhesive comprises polyurethane.

5. The patch bag according to claim 1, wherein the bag is made from a film having a total free shrink of at least 10 percent at 185° F., and the patch is made from a heat-shrinkable film having a total free shrink of at least 10 percent at 185° F.

6. The patch bag according to claim 1, wherein the bag has a seal layer comprising at least one member selected from the group consisting of polyamide and polypropylene.

7. The patch bag according to claim 1, wherein the seal is through the bag and not through the patch.

8. The patch bag according to claim 1, wherein the seal is through the bag and through the patch.

9. The patch bag according to claim 1, wherein the bag is an end-seal bag and the patch overhangs both side edges of the bag.

10. The patch bag according to claim 9, wherein the seal is through the patch and the bag.

11. The patch bag according to claim 9, wherein each lay-flat side of the side of the bag has a patch adhered thereto, with both patches overhanging both side edges of the bag, with overhanging portions of each of the patches being adhered to one another.

12. The patch bag according to claim 1, wherein the bag is made from a film having a total free shrink of from 10 to 120 percent at 185° F., and the patch is made from a heat-shrinkable film having a total free shrink of from 10 to 120 percent at 185 °F.

13. The patch bag according to claim 1, wherein the bag is made from a film having a total free shrink of from 15 to 80 percent at 185° F., and the patch is made from a heat-shrinkable film having a total free shrink of from 15 to 80 percent at 185° F.

* * * * *